Patented May 24, 1938

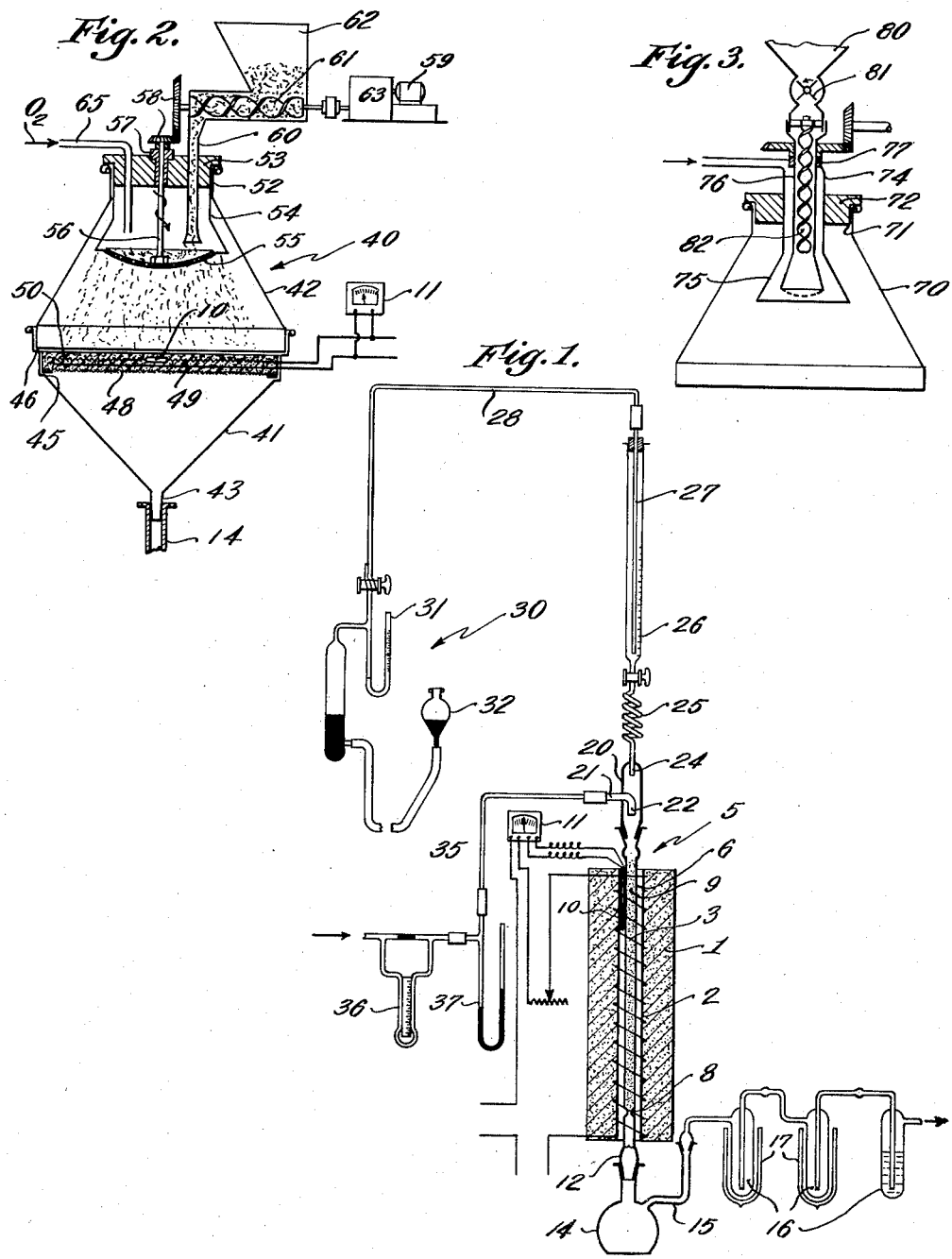

2,118,567

UNITED STATES PATENT OFFICE 2,118,567

CATALYTIC OXIDATION OF ORGANIC COMPOUNDS

Nicholas A. Milas, Belmont, and William L. Walsh, Somerville, Mass., assignors to Research Corporation, New York, N. Y., a corporation of New York Application August 27, 1935, Serial No. 38,050

7 Claims. (Cl. 260—116)

This invention relates to the catalytic oxidation of organic compounds and more particularly to the catalytic oxidation of hydrocarbons and their oxygenated derivatives to produce maleic acid, maleic acid anhydride and various other types of organic acids.

In processes embodying the catalytic oxidation of organic compounds it is the usual, if not the invariable, practice first to vaporize the base compound and then pass a mixture of the vaporized compound and an oxygen containing gas into contact with a suitable catalyzer maintained at a temperature of from 350° to 600° C., thereby effecting a vapor phase reaction. The contact time in all such processes is necessarily low, usually of the order of 0.3 second or less, and the yields of the more valuable products, such as maleic acid, are in many cases quite unsatisfactory, particularly where the base compound is of a highly volatile character.

Moreover, as catalytic oxidations are highly exothermic and as the reaction is carried out wholly in the vapor phase, there is present at all times the latent heat of vaporization and the heat of reaction, in addition to the extraneous heat employed to maintain the catalyzer at the desired temperature, and consequently the total heat present results in high temperatures which frequently lead to violent explosions, causing considerable damage to the equipment and endangering the safety of the operator. Hence, it has heretofore been found difficult, if not impossible, to effect a controlled vapor phase reaction with certain types of the more reactive organic compounds such, for example, as the terpenes, (pinene, limonene, etc.), various types of cyclic compounds (cyclohexene, cyclopentadiene, cyclopentane, etc.), and even when employing less reactive organic compounds it is the usual practice to use apparatus embodying means for maintaining the base compound in vapor phase and for dissipating the excess heat, or maintaining the reaction chamber in a predetermined range of temperatures.

The principal object of our invention is to provide an improved process and apparatus for effecting the catalytic oxidation of various types of organic compounds, a process which overcomes the aforementioned objectionable features inherent in the present and prior processes and wherein no extraneous heat is employed other than that used for maintaining the catalyst at the desired temperature; to provide a process and apparatus wherein a substantially constant temperature equilibrium is maintained; to provide a process and apparatus for effecting the catalytic oxidation of both liquid and solid compounds without first converting them into vapor and subsequently contacting the vapor with the catalyst; and to provide a process and apparatus for effecting catalytic oxidations at minimum temperatures consistent with satisfactory yields of the useful products.

Further objects will be apparent from a consideration of the following description and the accompanying drawing wherein Fig. 1 is a diagrammatic view of one form of apparatus particularly suitable for carrying out the catalytic oxidation of normally liquid compounds;

Fig. 2 is a diagrammatic view of an apparatus suitable for carrying out the catalytic oxidation of normally solid compounds; and Fig. 3 is a fragmentary diagrammatic view of an apparatus suitable for either liquid or solid compounds.

In accordance with the present invention the compound to be oxidized, if normally a liquid, is first passed through a stream of oxygen or oxygen containing gas and is broken up to form a heavy spray so that each liquid particle may adsorb, entrap or otherwise annex as much oxygen as possible without effecting any appreciable vaporization of the compound; but where the compound is normally a solid, it is first prepared in a powder or granular form and then passed through a stream or atmosphere of oxygen in the form of a dispersion of discrete particles, in both cases the initial step being carried out at normal temperature (20° to 25° C.). The liquid or solid dispersion is then brought into direct contact with a suitable catalyzer which is maintained at the optimum temperature conditions for the particular compound and in an atmosphere containing oxygen in an amount ten to thirty times the theoretical equivalent of that necessary for complete oxidation.

The base compound at the time of initial contact with the catalyzer immediately undergoes a partial oxidation which generates an appreciable amount of heat. The heat evolved during this reaction is absorbed by the unoxidized base compound which, as a result of this heat absorption, may become partially, if not completely vaporized in the immediate vicinity of the catalyst.

The depth of catalyzer and rate of flow or feeding of the reaction mixture is such that a contact period of between one and six seconds (preferably approximating three seconds) is maintained. By applying the minimum amount of heat necessary to maintain the catalyzer at its proper temperature and by uniformly conducting the reaction mixture through the reaction zone, a substantially constant temperature equilibrium within the reaction zone may be established and maintained, thereby avoiding excessive temperatures and their attendant dangers and eliminating the necessity of using apparatus embodying cooling coils or expensive high temperature bath, such as mercury and molten sulfur, in order to dissipate the heat of reaction.

The catalyst may comprise a compound containing one or more of the elements of the fifth or sixth groups of the periodic system, for example, vanadium, bismuth, molybdenum, tungsten, etc., which compounds may preferably form a coating on a carrier such as pumice, "alundum", asbestos, fuller's earth, kieselguhr, or the like material. The selection of the particular catalyst depends primarily upon the type of compound to be oxidized, the optimum reaction temperature of such compound, the yield of the desired reaction product, etc. For example, the catalytic oxidation of furfural to form maleic acid may be carried out in the presence of either bismuth vanadate or a mixture of vanadium and molybdenum oxides at an optimum temperature of approximately 290° C., and substantially the same results may be attained using a vanadium oxide catalyst at an optimum temperature of approximately 320° C. With temperatures of the order of 250° C. approximately twenty times the theoretical amount of oxygen may be used, whereas at a temperature of the order of 350° the amount of oxygen may be reduced to approximately fifteen times that theoretically required. As the optimum reaction temperature for a given catalyst may vary from a minimum of approximately 180° C. to a maximum of 500° C. it may be necessary to conduct preliminary experiments to determine the optimum temperature condition for the base compound when using a given catalyst, in order to produce the maximum yield.

Although our improved process and apparatus is useful in effecting the catalytic oxidation of various types of organic compounds, it is particularly suitable for the production of maleic and of maleic anhydride from hydrocarbons and oxygenated derivatives thereof. The term "hydrocarbons and oxygenated derivatives thereof", as used herein, includes (a) the aromatic compounds (benzene and its derivatives, furan and its derivatives, naphthalene, etc.); (b) hydrogenated cyclic compounds, comprising the hydroaromatic series (tetrahydrofurfuryl alcohol, cyclohexane, cyclohexene, etc.), the terpenes (pinene, abietic acid, etc.) and miscellaneous cyclic compounds (cyclopentane, cyclopentanone, cyclopentadiene, etc.); and (c) the aliphatic compounds (oleic acid, paraffins, etc.), all of which are susceptible to catalytic oxidation in accordance with the present invention.

Although various types of catalyzers may be used and prepared for use in accordance with procedures well known to those skilled in the art, we prefer to use a catalyzer prepared in the following manner: 100 parts (by weight) of pumice (8–10 mesh) are added to an aqueous solution containing 25 parts (by weight) of pure ammonium metavanadate and the mixture evaporated to dryness with continuous agitation. The impregnated pumice is then heated in a reaction chamber at a temperature of 350 to 375° C. for a period of about two hours while rapidly passing over it a current of air. The brownish-red catalyst thus formed is, as a rule, too active to be used for catalytic oxidations except when the oxidation is being carried out at temperatures less than those specified, and accordingly this catalyst should be pretreated at a temperature of about 300° C., with a mixture of air and the substance to be oxidized for a period of four to five hours, thereby reducing its activity. This treatment produces a catalyst of a blue-black appearance having a uniform activity which can easily be duplicated. A catalyst thus prepared has been found to remain active indefinitely provided the temperature of the reaction is not allowed to rise substantially above 500° C.

The molybdenum oxide-vanadium pentoxide mixtures may be prepared by adding the calculated amount of ammonium molybdate to ammonium metavanadate in water solution, then evaporating and treating the mixture as above described so that the final product contains a definite ratio by weight of molybdenum oxide to vanadium pentoxide. Metallic derivatives of salts of vanadium pentoxide such as bismuth vanadate, zinc vanadate, copper vanadate, etc., may be prepared by adding calculated amounts by weight of the metallic chloride or nitrate to ammonium metavanadate in water solution and then evaporating and treating the mixture as previously described.

Referring to Fig. 1, the apparatus shown therein comprises a vertically disposed, well insulated furnace 1 which includes a tubular core 2 of iron or like material and a resistance wire or like heating element 3 which is circumposed about the tube 2 and insulated in the usual manner. The lower part of a reaction chamber, designated generally by the numeral 5, is disposed within the tube 2 and consists of a pyrex tube 6 (approximately 78 cm. in length and 2.3 cm. in diameter), the lower end of the tube having an indentation shown at 8 to provide a shoulder for supporting a bed 9 of catalytic material which may be prepared in accordance with the procedure above described. A thermocouple 10 or like temperature indicating device may be interposed between the tubes 2 and 6, and suitable means such as a potentiometer and thermo-regulator, designated generally by the numeral 11, are provided to regulate the temperature of the furnace and thus maintain the catalyzer at a predetermined temperature. For a more detailed description of the temperature regulating device, reference may be had to an article published by us in the Journal of Industrial and Engineering Chemistry, volume 7, page 122, March 15, 1935 (analytical edition). The lower end of the tube 6 is provided with a ground joint 12 which fits into the mouth of a flask 14 or like receptacle having a side arm or delivery duct 15 which is connected with a series of traps 16, one or more of which may be immersed in a refrigerating mixture held in receptacle 17.

The upper part of the reaction chamber comprises an elongated tube 20 having a ground joint connection with the upper end of the tube 6, a laterally extending air delivery tube 21 which has a depending end 22, and a delivery tube 24 at its top disposed in substantially vertical alignment with the end 22 of the air delivery tube. A spiral capillary tube 25 (0.5 mm.) connects the delivery tube 24 with a burette 26 which forms a receptacle for the liquid to be oxidized. A tube 27 is disposed within the burette 26 and this tube is connected by a pipe line 28 to a device 30 for regulating the flow of liquid from the burette, here shown as comprising a calibrated mercury gauge 31 and an adjustable bulb or head 32 by means of which the pressure on the liquid within the burette may be varied, thereby regulating the rate of flow of the liquid into the reaction chamber.

The air delivery tube 21 is connected by a pipe line 35 to a suitable source of air supply, a tank of oxygen or other means (not shown) for supplying oxygen or an oxygen-containing gas, and a flowmeter 36 and manometer 37 are provided to measure and regulate the flow of gas into the reaction chamber.

In using this type of apparatus the catalyzer is first brought to the proper temperature, the line 35 is then opened and flowmeter 36 is regulated to produce a predetermined flow of air into the reaction chamber. After having made the necessary adjustments the stopcock on the burette 26 is opened and adjusted so as to permit a predetermined flow of liquid into the reaction chamber. The liquid to be oxidized falls in a succession of drops from the end of the delivery tube 24 onto the delivery tube 22 and is blown by the current of air emitted therefrom into a heavy spray or dispersion which is carried downwardly, while still in liquid phase, into direct contact with the heated catalyzer. An immediate reaction takes place upon striking the catalyzer and as a result the liquid droplets become partially vaporized, as previously explained. The reaction products are carried through the tube 6 and partly condensed in the flask 14 and condensers 16, the last of which may, as illustrated, function as a receiver of condensate.

The apparatus shown in Fig. 2 is particularly suitable for use in the catalytic oxidation of solid materials, e. g. furoic acid, abietic acid, naphthalene, etc., and comprises a reaction chamber 40 having a lower section 41 and an upper section 42, both of which may be of a generally conical shape. The lower section 41 is provided with an outlet duct 43 at its apex and this duct has a ground joint connection with the mouth of the flask 14. The upper part of the section 41 is formed with a pair of interior, circumferentially extending shoulders 45 and 46 which provide supports for a screen or perforated plate 48 and the lower edge of section 42, respectively. A bed 49 of catalytic material is carried by the screen or plate 48 and a plurality of heating elements 50 extend through the catalyzer and are insulated by jackets of ceramic or other suitable material. The thermocouple 10 and potentiometer and thermoregulator 11 are connected to the heating elements, as previously described in connection with Fig. 1, so that the catalyzer may be maintained at any desired temperature.

The upper section 42 is formed with an enlarged mouth 52 at its upper end and a plug or cap 53 tightly fits within the mouth of this section. A cylindrical sleeve 54 is secured to the cap 53 and extends downwardly into the upper part of the chamber and terminates in an outwardly flaring end portion. A concave plate 55, which preferably is perforated, is supported for rotation by a shaft 56 journaled in a bearing 57 carried by the cap 53, the shaft 56 being coaxial with the sleeve 54. The lower edge of the sleeve 54 preferably terminates slightly below the periphery of the plate 55 so that its flaring end portion provides a deflector which prevents the material from striking the outer wall of the section. The shaft 56 is driven through gears 58 by a motor 59. A delivery duct 60 communicates with a hopper 62 through a feed screw mechanism 61 which is connected to a reduction gearing 63 driven by the motor 59, the delivery duct 60 extending downwardly through the cap 53 with its end disposed above the plate 55. An air delivery tube 65 extends through the cap 53 with its end positioned so as to discharge a current of air or oxygen-containing gas directly against the upper surface of the plate 55.

In operation the catalyzer is first heated to the proper temperature and air or oxygen is admitted through the tube 65 into the reaction chamber at a predetermined rate. The solid material to be oxidized is placed in the hopper 62 and is fed into the reaction chamber at a constant predetermined rate, and upon striking the rotating plate 55 the material is uniformly scattered or dispersed throughout the upper part of the reaction chamber by the combined action of centrifugal force and the current of air impinging upon the rotating plate. The dispersed material upon striking the hot catalyzer 49 melts and immediately reacts, the heat of the reaction being utilized to maintain the catalyzer and the material to be oxidized at the desired temperature, thus preventing any substantial increase of temperature within the reaction zone.

The apparatus shown in Fig. 3 may be used in place of the section 42 and associated parts (52—65) for the catalytic oxidation of solids and also for liquids, if desired. This apparatus is designed to fit the lower section 41 of the apparatus shown in Fig. 2 and comprises a generally conical member 70 formed with an enlarged mouth 71 which receives a plug or cap 72 having a central opening through which passes an air delivery duct 74 provided with a depending outwardly flaring end 75. A rotatable delivery tube 76 is journaled in a bearing 77 coaxial with and rigidly secured to the tube 74 and a gear 78 is pinned or otherwise secured to the upper end of the tube 76, the gear being driven by a motor or other suitable means (not shown). The tube 76 communicates with a hopper 80 which may be provided with a rotatable valve 81 or like device for admitting predetermined quantities of solid or liquid material, and where solid material is to be used a stationary worm 82 may be secured to the lower end of the hopper so as to project downwardly through the bore of the delivery tube 76.

In operation, the liquid or solid material fed into the tube 76 is carried downwardly and thrown outwardly in the form of a dispersion or heavy spray into the current of air or oxygen discharged from the tube 74.

The following examples are illustrative of the invention as applied to various types of hydrocarbons and their oxygenated derivatives:

*Example 1.—Furfural*

Furfural was admitted to the reaction chamber at the rate of 1.3 cc. per hour and air was admitted simultaneously at the rate of 2.27 mols per hour. The resulting spray of furfural, while in liquid phase, contacted a catalyst consisting of vanadium pentoxide on pumice maintained at a temperature of 320° C., the contact period being approximately three seconds. The reaction products contained, among other things, 25% maleic acid.

*Example 2.—Furfural*

The above procedure was repeated, using a catalyst consisting of bismuth vanadate on pumice maintained at a temperature of 290° C., the rate of flow of furfural being 3 cc. per hour and that of air being 2.47 mols per hour. The reaction products contained, among other things, 20.3% maleic acid.

Example 3.—Furfural

The above procedure was again repeated, using a catalyst consisting of 90% vanadium pentoxide and 10% molybdenum oxide on pumice maintained at a temperature of 290° C. The furfural was admitted to the reaction chamber at the rate of 1 cc. per hour and air at the rate of 2.14 mols per hour. The reaction products contained, among other things, 23.2% maleic acid.

Example 4.—Furfuryl alcohol

Furfuryl alcohol was admitted to the reaction chamber at the rate of 1.1 cc. per hour and air at the rate of 2.14 mols per hour, the resulting spray of furfuryl alcohol, coming in direct contact with a catalyzer consisting of vanadium pentoxide on pumice and maintained at a temperature of 320° C., the contact period being approximately three seconds. The reaction products contained, among other things, 22.5% maleic acid.

Example 5.—Furan

A quantity of furan was treated in the manner above described, using a vanadium pentoxide catalyst maintained at a temperature of 320° C., the rate of addition of furan being 1.3 cc. per hour and that of air being 2.47 mols per hour. The reaction products contained, among other things, 65.1% maleic acid.

Example 6.—Furoic acid

Furoic acid was sprinkled into the reaction chamber at a rate of 1 gram per hour and air was admitted simultaneously at the rate of 2.47 mols per hour. The finely divided furoic acid came in contact with the vanadium pentoxide catalyst maintained at a temperature of 320° C., the contact period being approximately three seconds. The reaction products contained, among other things, 48.5% maleic acid.

Example 7.—Tetrahydrofurfuryl alcohol

A quantity of tetrahydrofurfuryl alcohol was run into the reaction chamber at a rate of 4.3 cc. per hour and air was admitted simultaneously at the rate of 2.47 mols per hour. The spray contacted a vanadium pentoxide catalyst maintained at a temperature of 320° C., the contact period being approximately three seconds. The reaction products contained, among other things, an appreciable amount of maleic acid.

Example 8.—Cyclohexane

A quantity of cyclohexane was treated as in the preceding examples, using a vanadium pentoxide catalyst maintained at a temperature of 350° C. The rate of addition of cyclohexane was 5.3 cc. per hour, that of air being 2.47 mols per hour, and the contact period being approximately three seconds. The reaction products contained, among other things, 16.2% maleic acid.

Example 9.—Cyclohexanol

A quantity of cyclohexanol was treated in a manner similar to that described in connection with Example 8, the rate of addition of cyclohexanol being 4.7 cc. per hour and that of air being approximately 2 mols per hour. The reaction products contained, among other things, 1.8% maleic acid.

Example 10.—Cyclohexanone

A quantity of cyclohexanone was treated as in Example 9, the rate of addition of the cyclohexanone being 3.78 cc. and that of air being approximately 2 mols per hour. The vanadium pentoxide catalyst was maintained at a temperature of 328° C. and the reaction products contained, among other things, 17.2% maleic acid.

Example 11.—Cyclopentane

A quantity of cyclopentane was admitted at the rate of 4.2 cc. per hour and air was simultaneously admitted at the rate of 2.47 mols per hour, the temperature of the vanadium pentoxide catalyst being 350° C. and the contact period approximately three seconds. The reaction products contained, among other things, an appreciable yield of maleic acid.

Example 12.—Cyclopentanone

A quantity of cyclopentanone was admitted to the reaction chamber at the rate of 3.8 cc. per hour and air at the rate of 2.47 mols per hour. A vanadium pentoxide catalyst was maintained at a temperature of 280° C., the contact period being approximately three seconds. The reaction products contained, among other things, an appreciable amount of maleic acid.

Example 13.—Mineral oil (high molecular weight paraffin)

A quantity of mineral oil was admitted to the reaction chamber at the rate of 3.4 cc. per hour and air simultaneously admitted at the rate of 2.47 mols per hour, a vanadium pentoxide catalyst maintained at a temperature of 380° C. being used. The contact period was about three seconds and the reaction products contained, among other things, a substantial yield of maleic acid.

Example 14.—Oleic acid

Oleic acid was treated in the manner above described, using a vanadium pentoxide catalyst maintained at a temperature of 280° C., the rate of addition of oleic acid being 3.77 cc. per hour and air at the rate of 2.5 mols per hour. The contact period was about three seconds and the reaction products contained, among other things, a substantial yield of maleic acid.

Example 15.—Benzene

A quantity of benzene was treated as above, using a vanadium pentoxide catalyst maintained at a temperature of 280° C. The rate of addition of benzene to the reaction chamber was 2 cc. per hour and the rate of air flow 2.47 mols per hour, the contact period being approximately three seconds. The reaction products contained, among other things, a substantial yield of maleic acid.

Example 16.—Pinene

A quantity of terpentine containing 90% or more pinene was admitted to the reaction chamber at a rate of 2.2 cc. per hour and air simultaneously admitted at the rate of 2.47 mols per hour. A vanadium pentoxide catalyst maintained at a temperature of 350° C. was used, the contact period being approximately three seconds. The reaction products contained, among other things, a substantial yield of maleic acid.

Example 17.—Abietic acid

A quantity of abietic acid was sprinkled into the reaction chamber at a rate of about 1 gram per hour and air was simultaneously admitted at the rate of 2.5 mols per hour. A vanadium pentoxide catalyst was used and maintained at a temperature of 280° C., the contact period being approximately three seconds. The reaction products included a substantial amount of maleic acid.

*Example 18.—Phenol*

A quantity of liquid phenol was admitted to the reaction chamber at the rate of 2 cc. per hour and air at the rate of 2.5 mols per hour. A vanadium pentoxide catalyst was used and maintained at the temperature of 280° C., the contact period being approximately three seconds. The reaction products contained, among other things, a substantial yield of maleic acid.

Although the optimum temperatures set forth in the foregoing examples are between 280° and 350° C., we have successfully carried out the catalytic oxidation of the compounds mentioned therein at substantially lower temperatures, e. g., 180° C., and also at temperatures substantially higher, e. g. 350° to 500° C., than the aforesaid optimum temperatures.

We claim:
1. In the method of catalytically oxidizing oxidizable organic materials involving contacting the same, admixed with free oxygen-containing gas, with a heated oxidation catalyst, the step which consists in conveying the oxidizable organic material to the heated solid catalyst in non-gaseous finely divided form.
2. The method defined in claim 1, in which the organic material is an aromatic compound.
3. The method defined in claim 1, in which the organic material is a hydrogenated cyclic compound.
4. The method defined in claim 1, in which the organic material is an aliphatic compound.
5. The method defined in claim 1, in which the organic material is naphthalene.
6. The method defined in claim 1, in which the organic material is cyclohexane.
7. The method defined in claim 1, in which the organic material is a high molecular weight paraffin hydrocarbon.

NICHOLAS A. MILAS.
WILLIAM L. WALSH.